O. P. ROGERS.
Fruit-Gatherer.
No. 65,279. Patented May 28, 1867.
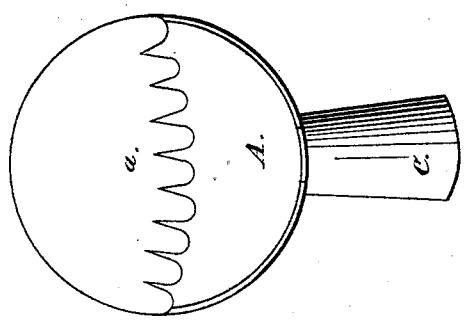
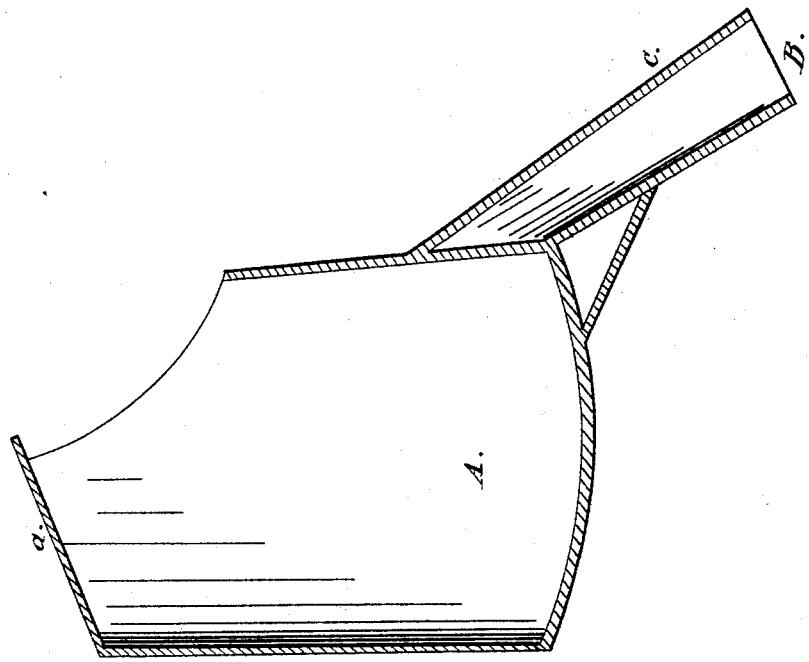
Witnesses:
Theo. Tusche
Fied B. Miles
Inventor:
O. P. Rogers
Per Munn & Co.
Attorneys.

United States Patent Office.

OLIVER P. ROGERS, OF ROXBURY, MASSACHUSETTS, ASSIGNOR TO HIMSELF AND DR. D. S. BARTLETT, OF THE SAME PLACE.

Letters Patent No. 65,279, dated May 28, 1867.

FRUIT-PICKER.

*The Schedule referred to in these Letters Patent and making part of the same.*

TO ALL WHOM IT MAY CONCERN:

Be it known that I, OLIVER P. ROGERS, of Roxbury, in the county of Norfolk, and State of Massachusetts, have invented a new and improved Fruit-Picker; and I do hereby declare that the following is a full, clear, and exact description thereof, which will enable others skilled in the art to make and use the same, reference being had to the accompanying drawings, forming part of this specification, in which—

Figure 1 is a central section through the fruit-picker; and

Figure 2 an end view.

This invention relates to a new and improved device for picking fruit from trees, and is more especially designed for picking fruit from the tops of trees or from branches beyond convenient reach, and which are generally shaken off and injured or bruised by the fall.

The device A is constructed of tin, and is formed similar to a scoop, the stick or handle being fitted in a socket, C, on the short side, and at an angle of about twenty degrees therewith. The stick or handle is to be made of wood, and may be of any desired or proper length, and the point of the scoop A, instead of being circular, is cut off square, and a piece of heavy galvanized plate, $a$, is soldered over the end at right angles with the scoop. This piece of iron is notched or serrated, and has from three to six teeth, which are made rounded or blunt, so as not to injure the fruit. The end of the scoop is placed against the limb of the tree, and the stem of the fruit is caught and held in the teeth, and the force is applied to the stem, and not to the fruit, and the latter therefore is separated or detached from the branch in the natural place. A sudden pull or jerk accomplishes the work, and the fruit drops into the scoop, which may not be lowered until it is full.

Having thus described my invention, I claim as new, and desire to secure by Letters Patent—

A device for picking fruit, constructed in the manner substantially as herein shown and described.

OLIVER P. ROGERS.

Witnesses:
    D. S. BARTLETT,
    W. F. MUNRO.